United States Patent [19]

Baker et al.

[11] 3,808,541

[45] Apr. 30, 1974

[54] AUTOMATIC FINE TUNING SYSTEM AND METHOD FOR USE IN SUPER-HETERODYNE RECEIVERS

[75] Inventors: Roy F. Baker, Franklin Park; Frank G. Banach, Oak Lawn; Jouke N. Rypkema, Lombard; Peter C. Skerlos, Arlington Heights, all of Ill.

[73] Assignee: Zenith Radio Corporation, Chicago, Ill.

[22] Filed: Nov. 8, 1972

[21] Appl. No.: 304,673

[52] U.S. Cl.......... 325/423, 178/5.8 AF, 178/7.3 R, 178/DIG. 15, 325/346, 325/421, 331/12, 331/25, 334/16

[51] Int. Cl............................................. H04b 1/16

[58] Field of Search.................... 178/5.8 AF, 7.3 R; 179/15 BC; 325/346, 60, 418–420, 422, 421, 325/423, 416, 417; 331/16, 36 R, 36 C, 36 L, 12, 331/17, 25; 334/15, 16

[56] References Cited

UNITED STATES PATENTS

| | | | |
|---|---|---|---|
| 2,702,852 | 2/1955 | Briggs | 325/421 |
| 3,710,261 | 1/1973 | Lindsey et al. | 325/346 |
| 3,160,815 | 12/1964 | Ford et al. | 325/346 |

*Primary Examiner*—Albert J. Mayer

[57] ABSTRACT

An automatic fine tuning system and method for an RF (radio frequency) receiver, especially for a television receiver, is disclosed which features both AFC (automatic frequency control) and APC (automatic phase control). A pair of phase discriminators coupled to the received signal and to reference oscillator means are interrelated such that the outputs thereof carry information as to the magnitude and polarity of the frequency difference between the received signal and the reference signals developed by the reference oscillator means. The disclosure specifically depicts television receiver apparatus incorporating novel AFC/APC systems in which the outputs of the phase discriminators are processed such as to provide a wide pull-in range without lock-out due to the associated or lower adjacent sound channels.

20 Claims, 11 Drawing Figures

AUTOMATIC FINE TUNING SYSTEM AND METHOD FOR USE IN SUPER-HETERODYNE RECEIVERS

BACKGROUND OF THE INVENTION

Most modern color television receivers include an AFC (automatic frequency control) system which is used to automatically fine tune the receiver to the RF (radio frequency) picture carrier of a selected channel. Such AFC systems include in a feedback loop a conventional frequency discriminator coupled to a variable frequency-determining element to control the frequency of the tuner's local oscillator.

A characteristic of AFC systems in general is their inability to lock the tuner's local oscillator exactly to a predetermined frequency. On the other hand, it is known that exact tuning of a tuner's local oscillator can be achieved by incorporation of an APC (automatic phase control) system in the receiver. The use of an APC system will ensure that for any selected television channel, the frequency of the local oscillator is such that the picture carrier intermediate frequency is precisely determined. It is important that the IF (intermediate frequency) of the picture carrier be precisely placed in the bandpass of the IF amplifier if the television receiver is to provide the best possible picture.

Attempts are being made by television receiver manufacturers to replace the peak-type video detector commonly used in television receivers with a synchronous-type detector in order to avoid the non-linearities and intermodulation products known to be associated with peak-type detectors. This recent interest in the use of synchronous-type modulation detectors has focused more attention on APC systems because a detector of this type requires that the frequency of the IF picture carrier be identical to the frequency of a locally generated reference oscillator. By the use of an APC system, the tuner's local oscillator frequency can be corrected until the frequency of the IF picture carrier matches the frequency of the reference oscillator. This will ensure the proper operation of the synchronous-type detector. The term "synchronous-type detector" is herein intended to mean a detector having two inputs, one of which contains the desired information on a modulated carrier and the other of which consists of a CW (continuous wave) signal whose frequency is identical to that of the carrier. This CW signal may be derived from a local reference oscillator whose frequency is equal to that of the carrier to be demodulated. The output of the synchronous-type detector consists of the algebraic products of its inputs.

Because of the nature of APC systems it is possible to realize a precision in fine tuning not possible with conventional AFC systems, although the pull-in range of most APC systems is less than that desired for automatic tuning. This can be seen from an examination of the operation of a typical APC system in a television receiver.

The typical APC system includes a phase detector whose inputs include a reference oscillator signal and, from the IF amplifier, an IF picture carrier. If the frequencies of the two inputs are different, the phase detector produces an output consisting of an AC error signal whose frequency depends upon the difference in frequency of the two inputs. This AC error signal is then used to cause a change in the frequency of the tuner's local oscillator at a rate proportional to the frequency of the error signal. The process of mixing the picture carrier with the local oscillator signal causes a corresponding change in the frequency of the IF picture carrier.

The IF picture carrier is then passed through the IF amplifier and returned to the phase detector. The inputs to the phase detector now include an input from its own reference oscillator and the IF picture carrier whose frequency is changing at a rate proportional to the error signal. The result is an output from the phase detector containing a new AC error signal which now has a DC component. This DC component of the error signal changes the frequency of the tuner's local oscillator in a direction which causes the frequency of the IF picture carrier to approach the frequency of the phase detector reference oscillator. This process continues until the frequency of the IF picture carrier and the frequency of the phase detector reference oscillator are the same.

As described above, the AC error signal which originates with the phase detector is effectively coupled around the loop comprising the phase detector, the local oscillator and mixer, and the IF amplifier. In this trip around the loop, the AC error signal incurs a delay which limits the pull-in range of the APC system. If the total loop delay is sufficient to cause a phase shift in the AC error signal which is greater than 90°, the phase detector will no longer develop an error signal of the proper polarity to correct the frequency of the local oscillator. In a typical color television receiver, this maximum permissible loop delay could limit the pull-in range of an APC system to 1 MHz or less. Since present television tuners require a pull-in in excess of 2 MHz, the use of a conventional APC system appears impractical.

The above descriptions make it clear that conventional AFC and APC systems have significant limitations in performance which render them unsuitable for use in a commercial television receiver employing synchronous-type video detection. This invention is directed to novel systems and methods which provide the advantages and the best qualities of both APC and AFC.

A straight-forward combination of AFC and APC in their conventional forms would probably be economically unattractive for use in television receivers. This combination is suggested in U. S. Pat. No. 2,777,055. In addition, there are other problems which a conventional combination of these systems would not solve.

One such problem is the propensity of a detuned television receiver to lock onto a lower adjacent sound carrier. Another problem is that encountered when the receiver is detuned in a way which places the desired picture carrier in or near the IF filter trap provided to attenuate the sound carrier for the adjacent television channel. When this occurs, the AFC system tends to lock onto the sound carrier associated with the desired picture carrier.

A method which has been used in conventional television automatic tuning systems to avoid the described problem involving the associated sound carrier is to reduce the pull-in range of the AFC system so that the associated sound carrier lies outside this range, thereby eliminating the sound carrier as a source of interference with the pull-in mechanism.

Another solution which is found in conventional AFC systems is described in U. S. Pat. No. 3,459,887, assigned to the assignee of this application. The referent system alters the characteristics of the frequency discriminator in the AFC system so that when the picture carrier is in or near its adjacent channel sound trap, the associated sound carrier will not prevent the local oscillator from locking onto the picture carrier. The AFC control voltage which is developed by the sound carrier is of the proper polarity to assist the local oscillator in moving in the proper direction to lock onto the picture carrier.

This latter method does solve the problem of lock-out caused by the associated sound carrier; however, it does not solve the problem which exists when the AFC system locks onto the lower adjacent sound carrier.

In light of the discussion above, it becomes apparent that conventional solutions employed in the prior art do not enable a television receiver to pull-in over a wide range and to a precise predetermined frequency without the possibility of locking onto a lower adjacent sound carrier.

OTHER PRIOR ART.

U.S. Pat. Nos. 2,740,046; 3,160,815; 3,673,321 and an article entitled *Synchronous Communications*, by J. P. Costas, IRE Proceedings, Dec. 1956.

OBJECTS OF THE INVENTION

It is a general object of this invention to provide for use in a superheterodyne receiver an improved frequency comparison system and method for comparing the frequency of an incoming signal carrier with a reference signal to develop an indication of the magnitude and polarity of the frequency difference between the received carrier and reference signal.

It is another object of this invention to provide an improved automatic tuning system and method for television receivers which will provide a wide frequency pull-in range and the capability of precise tuning.

It is a further object of this invention to provide an automatic tuning system and method for television receivers which is capable of causing a receiver to pull-in over a wide frequency range without locking onto either the associated or lower adjacent channel sound carriers.

Yet another object of this invention is to provide an improved automatic tuning system and method for television receivers which has an accurate pull-in over a wide range and which is economically and technically suited for fabrication in monolithic integrated circuit form.

BRIEF DESCRIPTION OF THE DRAWINGS

For a fuller understanding of the nature and objects of the invention, reference should be made to the following detailed description taken in conjunction with the accompanying drawings wherein.

DESCRIPTION OF THE PREFERRED EMBODIMENTS

Figures 1, 2:
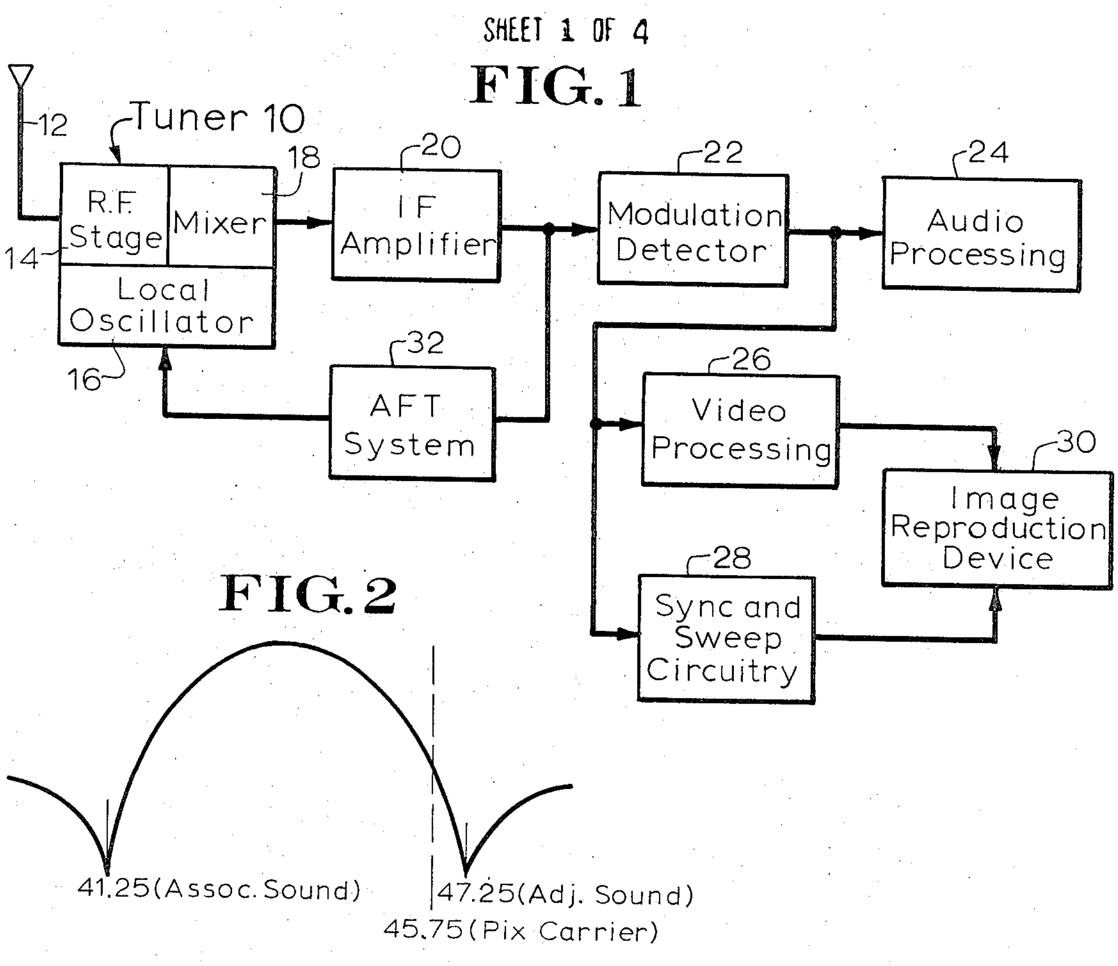
FIG. 1 is a schematic representation in block diagram form of a television receiver including an automatic fine tuning system constructed in accordance with this invention.
FIG. 2 illustrates a typical frequency response of an IF amplifier in a television receiver.

The invention described herein has broad applications, particularly in the area of superheterodyne receivers. FIG. 1 illustrates a particular method and apparatus for implementing the invention in a television receiver. However, this is not to suggest that the application of this invention is in any way limited to the illustrated television system or to television systems in general. An example of another possible application is its use in stereophonic audio systems.

Referring now to FIG. 1, the illustrated receiver has a tuner 10 whose input terminal is connected to a receiving antenna 12. The tuner 10 includes the customary RF stage 14, local oscillator 16, and mixer 18 for converting a selected one of the available RF carriers to a lower frequency carrier having a predetermined intermediate frequency.

An IF amplifier 20 includes any necessary steps of amplification including means for providing a suitable frequency bandpass and associated traps to insure rejection of unwanted carriers.

The selected IF carrier is then passed through IF amplifier 20 to a modulation detector 22 which recovers the information contained in the modulated IF carrier. This recovered information consists of audio, video and synchronization signals, each of which is coupled to its appropriate processing system. The audio is coupled to a conventional audio processing system 24, the video to a video processing system 26 and the sync information to a synchronization and sweep system 28.

Video processing system 26 selectively amplifies video frequency components for application to an image reproduction device 30.

An AFT (automatic fine tuning) system 32 has an input coupled to an output terminal of IF amplifier 20 and an output coupled to the tunable element of local oscillator 16. This AFT system embodies one aspect of the invention and will be described in detail below.

As discussed above, the problems associated with conventional AFC systems include their inability to exactly tune the local oscillator to a predetermined frequency and their susceptibility to lock onto either the associated or lower adjacent channel sound carriers of a television signal. FIG. 2 illustrates the typical bandpass characteristic of an IF amplifier in a conventional television receiver. Note that the picture carrier's IF frequency is 45.75 MHz when the receiver is properly tuned. The associated sound carrier and the lower adjacent sound carrier are located 4.5 MHz below and 1.5 MHz above the picture carrier respectively.

Figure 3:
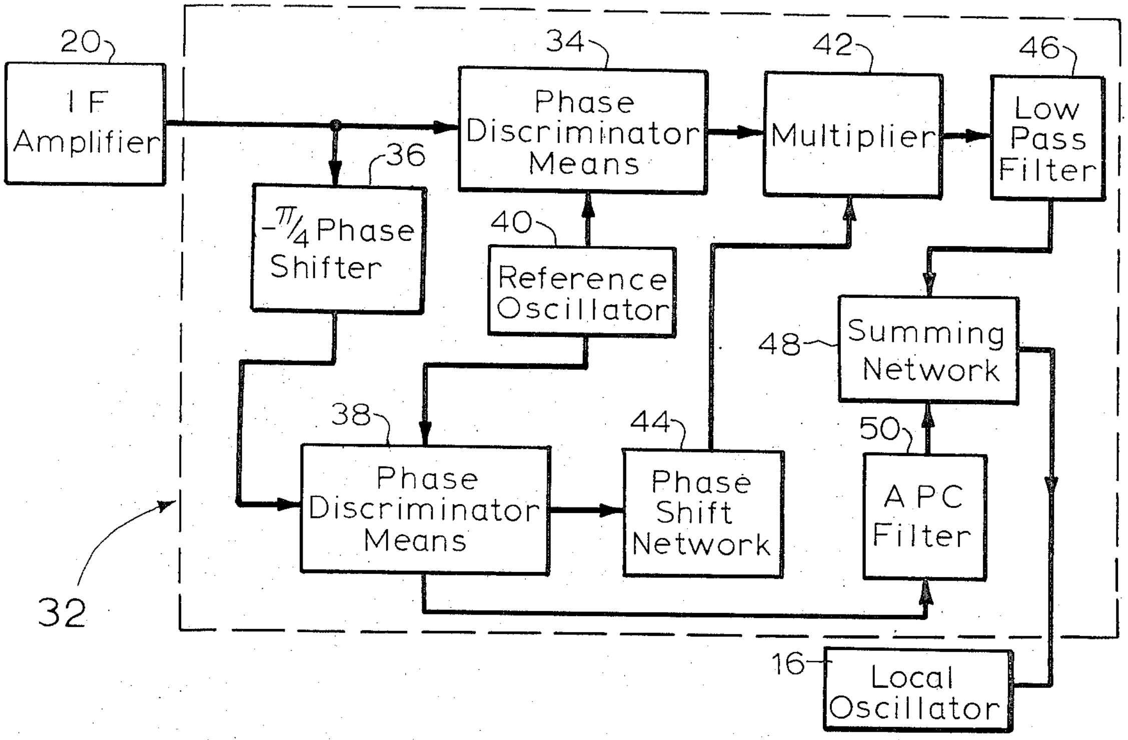
FIG. 3 is a detailed representation in block diagram form of the automatic fine tuning system described herein.

FIG. 3 depicts a system according to this invention which comprises a combination of sub-systems interconnected in a novel way to provide an AFT system which meets the above-stated objectives. The signal appearing at the output of IF amplifier 20 is coupled to a first phase discriminator means 38 through a phase shift network 36 and directly to a second phase discriminator means 34. Each of the phase discriminator means 34, 38 has as an additional input a CW (continuous wave) signal which is supplied by a reference oscillator 40 operating in the illustrated embodiment at 45.75 MHz.

If the frequency of the IF carrier which is coupled to phase discriminator means 34 and 38 is different from the frequency of reference oscillator 40, AC error signals appear at the output terminals of said phase discriminator means 34 and 38. These error signals contain a large beat frequency component whose frequency is equal to the difference in frequency between said reference oscillator frequency and the IF carrier. Though the error signals appearing at the outputs of phase discriminator means 34 and 38 are like in frequency, they differ in phase due to the insertion of phase shift network 36.

Figure 4A:
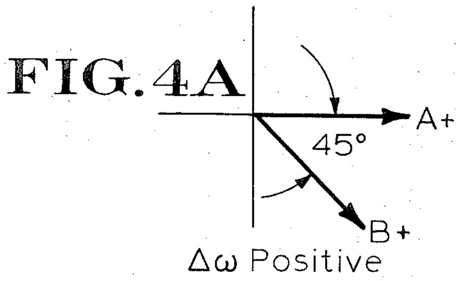
FIGS. 4A, 4B, 5A and 5B are vector diagrams useful in connection with a description of the operation of the automatic fine tuning system shown in FIG. 3.
Figure 4B:
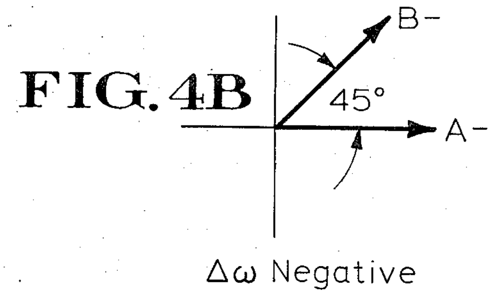

The behavior of the system up to this point can be best described by reference to FIGS. 4A and 4B wherein the error signal produced by phase discriminator means 34 is represented by vector A and the error signal produced by phase discriminator means 38 is represented by vector B. If the difference in angular frequency between the IF carrier and the reference oscillator 40 is $\Delta\omega$, $\Delta\omega$ will be positive when the frequency of the IF carrier is greater than that of the reference oscillator 40 and will be negative when the frequency of the IF carrier is less than that of the reference oscillator 40.

In the preferred embodiment, the outputs of phase discriminator means 34 and 38 consist of the product of their inputs and will thus inherently depend upon the instantaneous phase differences of those inputs. For example, if the signal produced by reference oscillator 40 is $\sin(\omega_r t)$ and the IF carrier can be represented as $\sin[(\omega_r+\Delta\omega)t]$, the output of phase discriminator means 34 is proportional to $\sin[(\omega_r+\Delta\omega)t] \times \sin(\omega_r t) = -½ \cos[(2\omega_r+\Delta\omega)t] + ½ \cos(\Delta\omega t)$. Since the higher frequency components of the signal will eventually be filtered out, the important part of the output is proportional to $\cos(\Delta\omega t)$.

If the IF carrier input to phase discriminator means 38 can be represented as $\sin[(\omega_r+\Delta\omega)\, t - \pi/4]$, its output is proportional to $\sin(\omega_r t) \times \sin[(\omega_r+\Delta\omega)\, t - \pi/4] = -½ \cos[(2\omega_r+\Delta\omega)\, t - 90/4]' + ½ \cos(\Delta\omega t - \pi/4)$. Again ignoring the higher frequency components of this signal, the output of phase discriminator means 38 is proportional to $\cos(\Delta\omega t - \pi/4)$. FIG. 4A illustrates the relative phase of the error signals for positive $\Delta\omega$. Note that their angular difference is due to the $-\pi/4$ phase shifter 36 which is in series with phase discriminator means 38.

When $\Delta\omega$ is negative, the only difference in the results obtained above is that the sign of $\Delta\omega$ now changes. Ignoring all higher frequency components, the output of phase discriminator means 38 is proportional to $\cos(-\Delta\omega t - \pi/4)$. Since $\cos-(\Delta\omega t + \pi/4)$ equals $\cos(\Delta\omega + \pi/4)$, the phase of the error signal produced by phase discriminator means 38 has changed by 90°. This is illustrated in FIG. 4B. The output of phase discriminator means 34 is now proportional to $\cos(-\Delta\omega t) = \cos(\Delta\omega t)$. This result is also shown in FIG. 4B. Only the position of vector B has changed as a result of a change in the sign of $\Delta\omega$. This suggests that the polarity of $\Delta\omega$ can be determined by a comparison of the relative phase of the error signals. Of course, for a phase discriminator of the type described above, a similar result is obtained to some extent anytime the instantaneous phase difference between the inputs to one phase discriminator is unequal to the instantaneous phase difference between the inputs to the other phase discriminator (other than the trivial case where they differ by 180° or a multiple thereof).

In the system shown in FIG. 3, two error signals are developed whose frequency reveals the difference between the IF carrier frequency and the frequency of the reference oscillator 40 and whose relative phase discloses the polarity of the frequency difference.

The error signal produced by phase discriminator means 38 is coupled to multiplier 42 by means of phase shift network 44. The error signal produced by phase discriminator means 34 is coupled directly to multiplier 42. Phse shift network 44 introduces a frequency dependent phase shift which causes error signals of a very low frequency to be shifted in phase by 90° while higher frequency error signals are phase shifted by a lesser amount, tending toward 0° for very high frequencies. Network 44 may comprise an R-C high-pass circuit for achieving the described frequency dependent phase shift.

As a result of the frequency dependent phase shift which is introduced by phase shift network 44, multiplier 42 has as its inputs two error signals whose relative phase depends not only upon whether $\Delta\omega$ is positive or negative, but also upon the magnitude of $\Delta\omega$. The multiplier input signals thereby contain in their phase relationship enough information to determine the extent and direction of any deviation in frequency between the IF carrier signal and that of the reference oscillator.

Figure 5A:
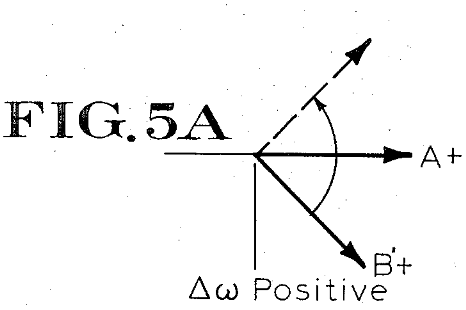
Figure 5B:
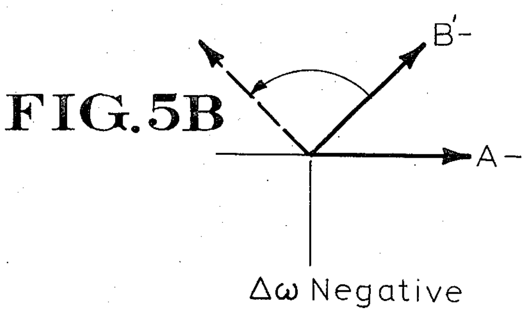

The way in which the multiplier extracts the desired information can best be understood by reference to FIG. 5A and 5B wherein the error signal generated by phase discriminator means 34 is represented by vector A and the phase-shifted error signal appearing at the output of phase shift network 44 is represented by vector B'.

Multiplier 42 is a device whose output is proportional to the cosine of the phase difference between its two inputs. FIG. 5A illustrates the condition which exists when $\Delta\omega$ is positive, that is, when the frequency of the IF carrier is greater than the frequency of the reference oscillator. When $\Delta\omega$ is positive, the angle between A and B' can vary between minus 45° and plus 45° due to the phase shift generated by phase shift network 44. Since the angle between A and B' is always less than 90° for $\Delta\omega$ positive, the multiplier output must be positive whenever the IF carrier is greater in frequency than the reference oscillator 40.

FIG. 5B illustrates the condition existing when the frequency of the IF carrier is less than that of reference oscillator 40, i.e., when $\Delta\omega$ is negative. When the frequency of the error signal is high, corresponding to a large negative difference in frequency between the IF carrier and the reference oscillator 40, vector B' leads vector A by 45°; for this condition the multiplier output would still be positive. As the frequency of the IF carrier tends toward the frequency of the reference oscillator 40 from a negative direction, the frequency of the error signal decreases. As the frequency of the error signal decreases, the phase shift associated with phase shift network 44 increases and causes the angle between vectors A and B′ to increase in the direction indicated. It can be seen that at some frequency the angle between vectors A and B′ will be 90°. At this point the multiplier output will be zero. Further decreases in the frequency of the error signal produce a larger phase angle between A and B′ exceeding 90°, thereby causing the multiplier output to go negative. It is evident that careful design of phase shift network 44 can place the vectors A and B′ in quadrature at any desired frequency, thereby producing a null in the multiplier output at any desired frequency.

Although the FIG. 3 system shows that only phase discriminator means 38 is followed by a phase shift network, other embodiments of this aspect of the invention may include a phase shift network also following phase discriminator means 34. Various combinations of high-pass and low-pass filters following either or both phase discriminator means 34, 38 will yield zeros in the characteristic curve at preselectable positions. For example, placing a low-pass filter after phase discriminator means 34 and a high-pass filter after phase discriminator means 38 will result in an AFC curve having two zeros to the left of the origin of the FIG. 6 curve, both of which can be positioned at preselected points depending upon the choice of filter time constants.

At this point it should be noted that, although the vectors of FIGS. 4–5 are shown as being of constant length, their length does vary. However, their angular displacement is what has been emphasized to facilitate the description of this aspect of the invention.

Figure 6:
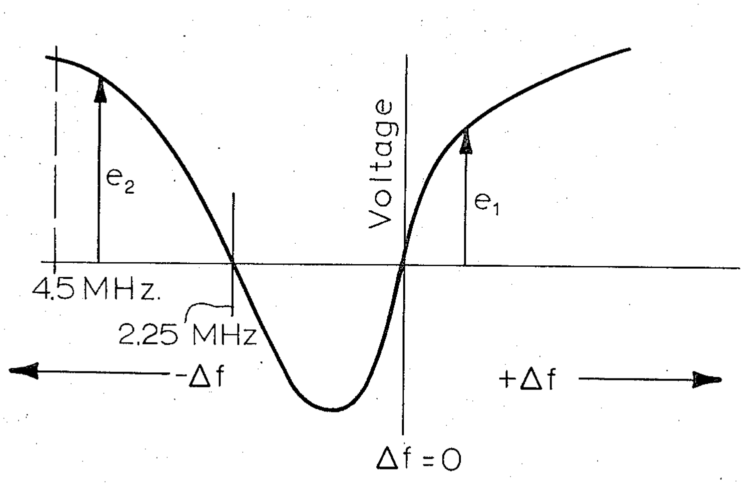
FIGS. 6 and 7 are curves employed in connection with a description of the operating characteristics of the automatic fine tuning system shown in FIG. 3.

FIG. 6 is obtained by plotting the cosine of the angle between vectors A and B′ for all possible frequency differences between the IF carrier and the reference oscillator 40 within the pull-in range of the system. The curve is shown as going through the origin because, at $\Delta f = 0$, the frequency of the IF picture carrier and the frequency of the reference oscillator 40 are the same. The output of phase discriminator means 38 becomes a DC voltage which cannot be passed by phase shift network 44. With no signal at one of its inputs, the output of multiplier 42 must be zero. The other zero output is shown as being at $\Delta f = -2.25$ MHz and occurs as a result of the quadrature relationship between vectors A and B′ as discussed above.

The output of multiplier 42 is coupled to a low-pass filter 46 which removes the AC components. The output of low-pass filter 46 is a DC AFC voltage which varies as a function of frequency according to the curve shown in FIG. 6. If only AFC were desired for certain applications, this voltage could be coupled directly to the tuning element of local oscillator 16 to complete an automatic frequency control loop.

In the illustrated television receiver application of FIG. 3, the phase shift network 44 is preferably designed to place the null in the multiplier output at $\Delta\omega$ corresponding to −2.25 MHz. By this expedient, if the receiver is detuned so that the desired picture carrier produced an AFC voltage $e_1$, (See FIG. 6), the associated sound carrier would then produce an AFC voltage $e_2$. In this case $e_2$ is of the same polarity as $e_1$ and will aid $e_1$ in pulling the local oscillator toward the condition where $\Delta\omega$ equals zero. It is evident that the AFC voltage generated in response to the associated sound carrier will be of such a polarity to aid the voltage generated in response to the picture carrier for all conditions where the frequency of the IF picture carrier is greater than the frequency of reference oscillator 40 by up to 2.25 MHz.

Up to this point, the invention has disclosed a novel method of providing an AFC characteristic which allows pull-in over a wide frequency range while rejecting false locks on the associated sound carrier. If instead of coupling the AFC voltage appearing at the output terminal of low-pass filter 46 to the tuning element of local oscillator 16, both the AC error signal appearing at the output of phase discriminator means 38 and the DC AFC voltage appearing at the output terminal of low-pass filter 46 are coupled to a summing network 48, a much improved system results.

Summing network 48 is a means for developing a composite AFT control signal which adds the error signal appearing at the output of phase discriminator means 38, which consists of AC and DC components to the AFC voltage appearing at the output of low-pass filter 46, a DC component. The composite control signal resulting from this summation is coupled from summing network 48 to the tuning element of local oscillator 16. The result is an automatic frequency control/automatic phase control system which not only pulls in over a wide frequency range but is capable of the exact tuning that is characteristic of APC systems.

That a true automatic phase control system is available becomes evident upon examination of the function of either phase discriminator means 34 or 38. Each has inputs consisting of a reference CW signal and an IF carrier. The output of either phase discriminator means is a signal whose magnitude is dependent on the instantaneous phase difference between its inputs. When either output is coupled by means of a conventional APC filter 50 to a tuning element of a local oscillator 16, the APC loop is completed.

The AFC and APC modes of operation interact as follows; as the AFC mode (represented by the DC component of the composite control signal) pulls the local oscillator toward its correct frequency, the AFC voltage increases. At some point the APC voltage (represented by the AC error signal developed by phase discriminator means 38) dominates the DC AFC voltage and causes the APC mode to control the operation of the local oscillator 16. When APC lock occurs the DC AFC voltage decreases to zero. The method by which this APC system causes the local oscillator 16 to lock upon that frequency whereby the IF picture carrier is identical to the frequency of the reference oscillator 40 is well understood in the art and need not be further amplified herein.

At this point, the invention has been shown to provide a wide range of automatic fine tuning due to the AFC mode and zero frequency error due to the APC mode. In addition, the phase of the IF picture carrier is locked or related to that of the reference oscillator 40. The advantage gained by this phase lock will be discussed below.

Figure 7:
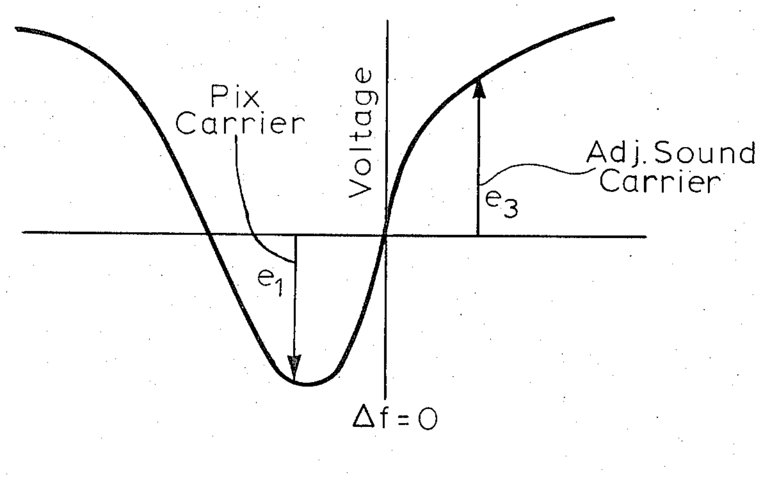

When the receiver is detuned in a certain direction, the AFC characteristic illustrated in FIG. 6 insures that the receiver will not lock onto the associated sound carrier; however, when the receiver is detuned in the other direction there is a possibility of locking onto the sound carrier of the lower adjacent channel. FIG. 7 illustrates the AFC voltages which are generated in that case. $e_1$ is the AFC voltage generated in response to the IF picture carrier while $e_3$ is the AFC voltage generated in response to a lower adjacent sound carrier. In conventional AFC systems, it is possible for the voltage $e_3$ which is generated by the lower adjacent sound carrier to be of sufficient amplitude to overcome the effect of the voltage $e_1$ and cause the system to lock onto that adjacent sound carrier.

This invention overcomes the described problem created by the lower adjacent sound carrier in the following way. Assume for the moment that the FIG. 3 automatic fine tuning system has locked onto the lower adjacent sound carrier. In that case, both phase discriminator means 34 and 38 generate DC voltages in response to the adjacent sound carrier, since it is now of the same frequency as the reference oscillator 40. In addition to this DC voltage, an AC error signal is generated by both phase discriminator means 34 and 38 in response to the picture carrier which is spaced in frequency from the lower adjacent sound carrier by 1.5 MHz. By the same means discussed above, multiplier 42 generates an AFC voltage in response to these error signals. The gain of the AFC system is such that the DC AFC voltage now generated by multiplier 42 is sufficient to overcome the APC voltage attempting to hold the local oscillator to the lower adjacent sound carrier. The result is that the tuner local oscillator 16 is caused to change frequency in a direction which tends to tune the receiver so that the frequency of the IF picture carrier approaches that of the reference oscillator 40. The APC mode described above again takes over and locks the receiver to the desired picture carrier.

The reason why local oscillator 16 is now not caused to unlock by reason of an error voltage generated in response to the lower adjacent sound carrier can best be understood by reference again to FIG. 2 which illustrates a typical IF bandpass characteristic of a television receiver. Note that when the receiver is tuned so that the picture carrier is at or near 45.75 MHz, the lower adjacent sound carrier is in or near the trap seen at 47.25 MHz. The relative magnitude of the two carriers is now such that any error voltage generated by the adjacent sound carrier is insignificant.

As suggested above, advantage will be taken of the fact that the IF picture carrier is now locked in phase to that of reference oscillator 40. Modulation detector 22 of FIG. 1 is preferably a synchronous detector whose CW injection is derived from reference oscillator 40. The well-known advantages of synchronous detection are thereby easily incorporated into this automatic fine tuning system.

Figure 8:
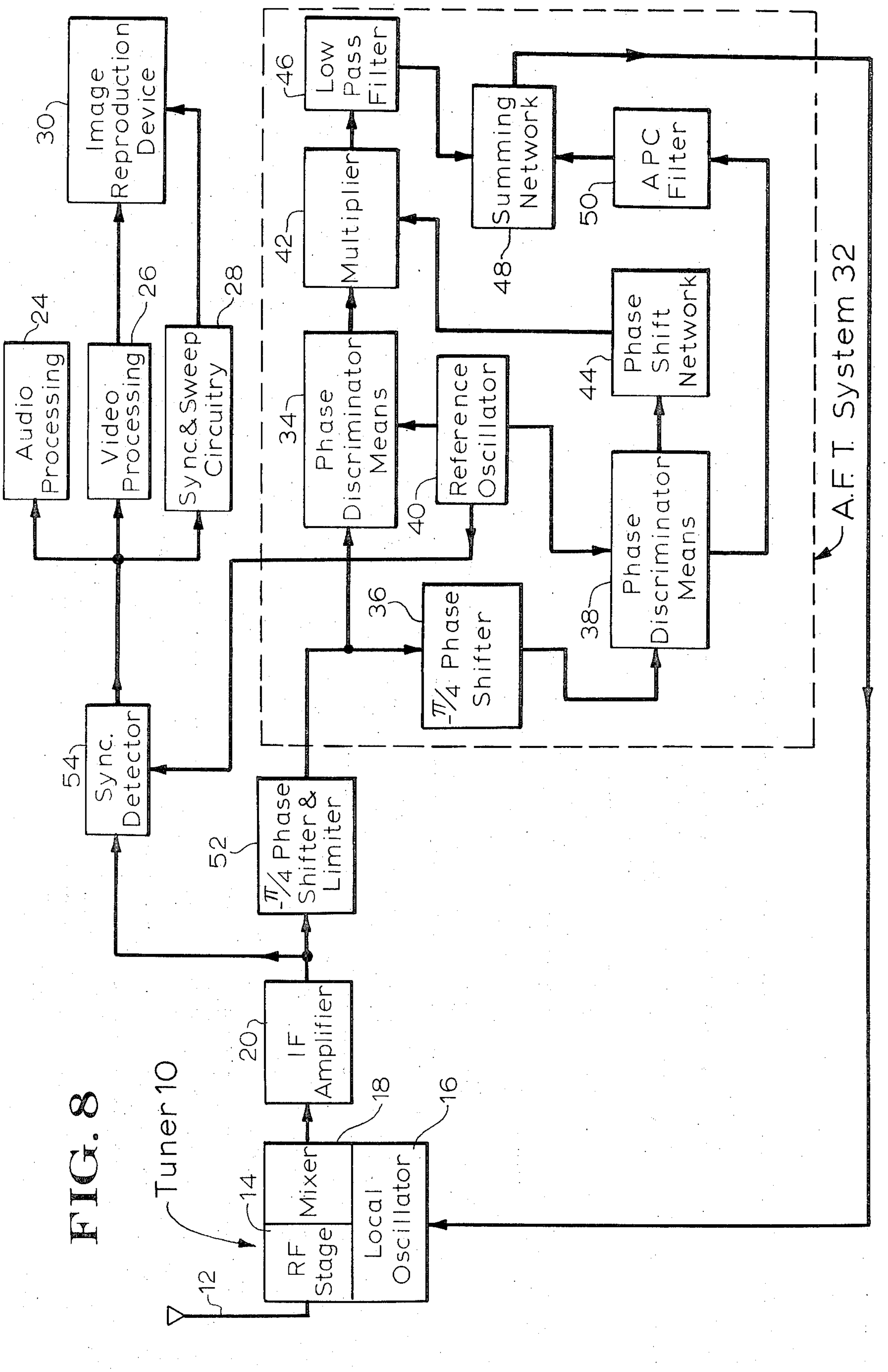
FIG. 8 is a schematic representation in block diagram form of a television receiver with a synchronous-type detector which incorporates the automatic fine tuning system described herein.

A complete schematic diagram of the above-described AFT system incorporated in a television receiver with a synchronous detector is illustrated in FIG. 8. After pull-in, the phase of the IF picture carrier which is applied to phase discriminator means 38 will be in quadrature with the phase of reference oscillator 40. The −45° phase shifter and limiter 52 is therefore serially connected in the signal path between IF amplifier 20 and AFT system 32 to insure that the CW signal generated by reference oscillator 40 is in phase with the IF carrier which is coupled to synchronous detector 54. A limiter is included in 52 to remove any amplitude modulation present on the carrier prior to its application to the AFT system 32.

The operation of phase discriminator means 34 and 38, multiplier 42, and synchronous detector 54 is obviously dependent on the phase relationship of their inputs. FIGS. 3 and 8 represent one method of providing the proper phase shifts for the functions described. The particular combination of phase shifts employed herein are given by way of illustration and not as a limitation on this invention.

Figure 9:
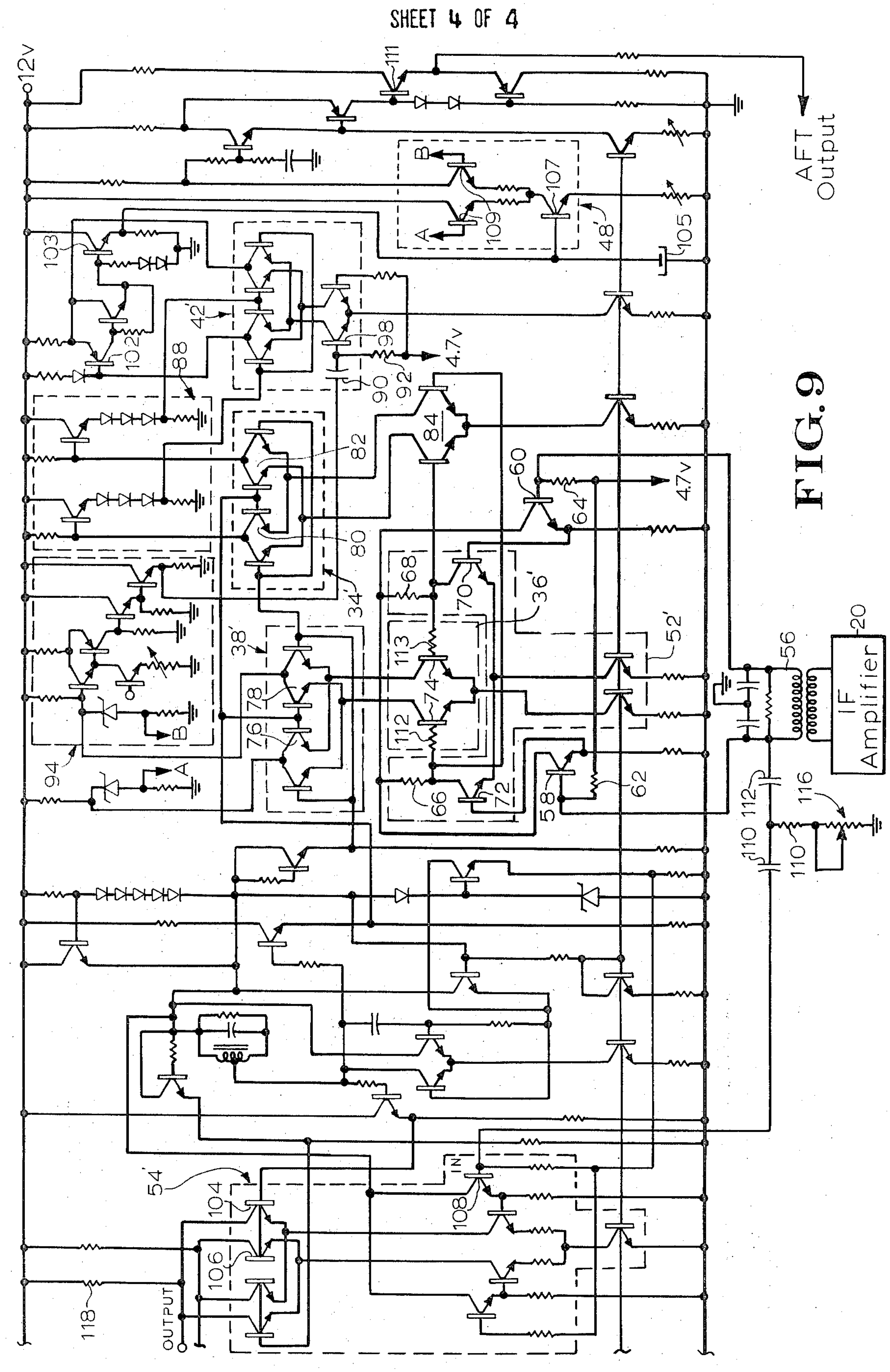
FIG. 9 is a schematic representation in circuit form illustrating a preferred embodiment of the invention described herein.

The preferred embodiment of AFT system 32 is shown in schematic form in FIG. 9 wherein primed numbers indicate structures corresponding to structures with like numbers in FIG. 8. One difference between the systems of FIG. 8 and FIG. 9 is that the FIG. 9 phase shifter and limiter 52' includes an additional 180° phase shift over that of phase shifter 52 in FIG. 8. The effect of this additional phase shift is to reverse the polarity of the detected video signal.

The output of IF amplifier 20 is coupled through transformer network 56 to emitter followers 58 and 60. The signal is then applied in a common mode fashion to the −45° phase shifter and limiter 52'. The −45° phase shift is realized by the interaction of resistors 62 and 64 with the parameters of transistors 58 and 60 and resistors 66 and 68 with the parameters of transistors 70 and 72. The outputs of the −45° phase shifter and limiter 52' are developed across resistors 66 and 68 and coupled therefrom to phase shifter 36' and transistor pair 84.

The phase shift associated with phase shift network 36' is produced by the interaction between resistors 112, 113 and the parameters of transistor pair 74. The phase shifted IF signal is then coupled via the collectors of transistor pair 74 to phase discriminator means 38'. The other input to phase discriminator means 38' is generated by reference oscillator 40' and applied to the bases of transistors 76 and 78.

In like manner, phase discriminator means 34', shown here as a phase detector, has two inputs; the CW signal generated by reference oscillator 40' is applied to the bases of transistors 80 and 82 and the IF signal is applied via current source pair 84. The error signal developed by phase discriminator means 34' is coupled to multiplier 42' through a level shifting network 88.

The error signal developed by phase discriminator means 38' is coupled via level shifter 94 and a phase shift network consisting of capacitor 90 and resistor 92 to multiplier 42' and applied to the base of transistor 98. The push-pull output of multiplier 42' is applied to transistor 102 thereby producing a single-ended output at the emitter of transistor 103. The multiplier output is filtered by capacitor 105 and coupled to the base of transistor 107, forming one input of summing network 48'. The other input to summing network 48' appears at the bases of transistor pair 109 and is taken from the output terminals marked A, B of phase discriminator means 38'. The AFT output is taken as shown from the emitter of transistor 111.

Synchronous detector 54' has a CW input from reference oscillator 40' applied to the bases of transistors 104 and 106. The IF signal is coupled to the base of transistor 108 through capacitor 110. The RC network consisting of capacitor 112 and resistors 114 and 116 introduces a phase shift to the IF signal which is adjustable and which compensates for deviation in the 90° phase shift generated by phase shifter and limiter 52'.

The output of synchronous detector 54' is developed across resistor 118 and applied therefrom to the appropriate audio, video and sync processing circuitry.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

We claim:

1. In a superheterodyne receiver having a tunable input stage with a local oscillator and mixer for purposes of converting a selected RF carrier to an IF carrier having a predetermined fixed frequency, a frequency determining system providing a DC voltage indicative of the direction and magnitude of the difference in frequency between said IF carrier and said reference signal, comprising:

means for generating first and second reference signals of like predetermined frequency and related phase;

a first phase discriminator means receiving as inputs said IF carrier and said first reference signal for developing a first error signal related in frequency to the frequency difference between said IF carrier and said first reference signal and dependent upon the instantaneous phase difference between said first reference signal and said IF carrier;

second phase discriminator means receiving as inputs said IF carrier and said second reference signal for developing a second error signal related in frequency to the frequency difference between said IF carrier and said second reference signal and dependent upon the instantaneous phase difference between said second reference signal and said IF carrier input, the relative phase of said first and second reference signals and the relative phase of said IF carrier at the inputs to said first and second phase discriminator means being chosen to cause the instantaneous phase difference between the inputs to said first phase discriminator means and the instantaneous phase difference between the inputs to said second phase discriminator means to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent on said phase relationship between said error signals, said combining means including a multiplier, means for coupling one of said first and second error signals to said multiplier, and a frequency dependent phase shift network which is coupled between said multiplier and the other of said error signals, said phase shift network introducing a frequency dependent phase shift in said other error signal to provide said multiplier with two error signals of like frequency whose phase difference varies according to the frequency of said error signals.

2. A system as defined in claim 1 wherein said fixed phase difference between said first and second reference signals is such that the dot product of the vectors of said error signals applied to said multiplier changes sign as the frequency of said IF carrier becomes greater or less than the frequency of said reference signals.

3. A system as defined in claim 1 including a summing network wherein said DC output voltage of said multiplier and the output of one of said first and second phase discriminator means are both applied to said summing network to generate a control voltage having AC and DC components.

4. In a superheterodyne receiver having a tunable input stage with a local oscillator and mixer for purposes of converting a selected RF carrier to an IF carrier having a predetermined frequency, a frequency determining system providing a DC voltage indicative of the direction and magnitude of the difference in frequency between said IF carrier and said reference signal comprising:

means for generating first and second reference signals of like predetermined frequency and related phase;

a first phase discriminator means receiving as inputs said IF carrier and said first reference signal for developing a first error signal related in frequency to the frequency difference between said IF carrier and said first reference signal and dependent upon the instantaneous phase difference between said first reference signal and said IF carrier;

second phase discriminator means receiving as inputs said IF carrier and said second reference signal for developing a second error signal related in frequency to the frequency difference between said IF carrier and said second reference signal and dependent upon the instantaneous phase difference between said second reference signal and said IF carrier input, the relative phase of said first and second reference signals and the relative phase of said IF carrier at the inputs to said first and second phase discriminator means being chosen to cause the instantaneous phase difference between the inputs to said first phase discriminator means and the instantaneous phase difference between the inputs to said second phase discriminator means to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent on said phase relationship between said error signals, said combining means including a multiplier, a first phase shift network coupling one of said first and second error signals to said multiplier, and a second phase shift network coupling the other of said error signals to said multiplier, said first and second phase shift networks having predetermined time constants associated therewith for introducing in said error signals predetermined frequency dependent phase shifts, thereby causing said multiplier to generate a DC output voltage having one or more zeros at preselected frequencies of said error signals.

5. In a superheterodyne receiver, an automatic frequency control system comprising:

a tuner having a local oscillator and mixer for purposes of converting a selected RF carrier to an IF carrier having a predetermined nominal intermediate frequency;

means for generating first and second reference signals having a like predetermined frequency $f_0$ and a predetermined fixed phase difference;

a first phase discriminator means receiving as inputs said IF carrier and said first reference signal for developing a first error signal related in frequency to the frequency difference between said IF carrier and said first reference signal, dependent upon the instantaneous phase difference between said first reference signal and said IF carrier, and having a phase related to the phase of said first reference signal;

a second phase discriminator means receiving as inputs said IF carrier and said second reference signal for developing a second error signal related in frequency to the frequency difference between said IF carrier and said second reference signal, dependent upon the instantaneous phase difference between said second reference signal and said IF carrier input, and having a phase related to the phase of said second reference signal, the relative phase of said first and second reference signals and the relative phase of said IF carrier at the inputs to said first and second phase discriminator means being chosen to cause the instantaneous phase difference between the inputs to said first phase discriminator means and the instantaneous phase difference between the inputs to said second phase discriminator means to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent on said phase relationship between said error signals, said combining means includes a multiplier and means for coupling one of said first and second error signals to said multiplier, and a frequency dependent phase shift network which is coupled between said multiplier and the other of said error signals, said phase shift network introducing a frequency dependent phase shift in said other error signal, thus providing said multiplier with two error signals of like frequency whose phase difference varies according to the frequency of said error signals; and means responsive to the DC voltage generated by said combining means for adjusting the frequency of said local oscillator toward a condition whereby the frequency of said IF signal is equal to that of said reference signal.

6. A system as defined in claim 5 wherein said fixed phase difference between said first and second reference signals is such that the dot product of the vectors of said error signals applied to said multiplier changes sign as the frequency of said IF carrier becomes greater or less than the frequency $f_o$ of said reference signals.

7. A system as defined in claim 6 for purposes of locking a desired IF carrier to said predetermined frequency $f_0$ when said desired carrier is accompanied by an associated carrier having a frequency lower than $f_0$ by a fixed frequency difference $f$, $f$, wherein the frequency of said first and second reference signals, said fixed phase difference between said first and second reference signals, and said frequency dependent phase shift produced by said phase shift network are such that a phase relationship is created between said error signal received by said multiplier which causes the dot product of the vectors associated with said error signals to exhibit the following characteristics, namely: said dot product has a first predetermined polarity in response to a carrier having an IF frequency greater than $f_o$, a second predetermined polarity in response to a carrier having an IF frequency between $f_o$ and predetermined frequency $f_1$, which is lower than $f_o$ by less than $\Delta f$, and said first predetermined polarity in response to a carrier having an IF frequency below $f_1$ whereby, when the receiver is mistuned such that the IF frequency of said desired carrier is higher than $f_o$ while the frequency of said associated carrier remains lower than $f_1$, the DC output voltage generated in response to said associated carrier is of the same polarity as that generated by said multiplier in response to said desired carrier.

8. In a superheterodyne receiver, an automatic frequency control system comprising:

a tuner having a local oscillator and mixer for purposes of converting a selected RF carrier to an IF carrier having a predetermined nominal intermediate frequency;

means for generating first and second reference signals having a like predetermined frequency $f_0$ and a predetermined fixed phase difference;

a first phase discriminator means receiving as inputs said IF carrier and said first reference signal for developing a first error signal related in frequency to the frequency difference between said IF carrier and said first reference signal, dependent upon the instantaneous phase difference between said first reference signal and said IF carrier and having a phase related to the phase of said first reference signal;

a second phase discriminator means receiving as inputs said IF carrier and said second reference signal for developing a second error signal related in frequency to the frequency difference between said IF carrier and said second reference signal, dependent upon the instantaneous phase difference between said second reference signal and said IF carrier input, and having a phase related to the phase of said second reference signal, the relative phase of said first and second reference signals and the relative phase of said IF carrier at the inputs to said first and second phase discriminator means being chosen to cause the instantaneous phase difference between the inputs to said first phase discriminator means and the instantaneous phase difference between the inputs to said second phase discriminator means to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent on said phase relationship between said error signals, said combining means including a multiplier, a first phase shift network coupling one of said first and second error signals to said multiplier, and a second phase shift network coupling the other of said error signals to said multiplier, said first and second phase shift networks having predetermined time constants associated therewith for introducing in said error signals predetermined frequency dependent phase shifts, thereby causing said multiplier to generate a DC output voltage having zeros at preselected frequencies of said error signals; and means responsive to the DC voltage generated by said combining means for adjusting the frequency of said local oscillator toward a condition whereby the frequency of said IF signal is equal to that of said reference signals.

9. In a superheterodyne receiver, a dual mode automatic fine tuning system capable of both automatic frequency and phase control, comprising:

a tuner having a local oscillator and mixer for purposes of converting a selected RF carrier to an IF carrier having a predetermined frequency;

means for generating first and second reference signals of like predetermined frequency and predetermined fixed phase difference;

a first phase discriminator means receiving as inputs said IF carrier and said first reference signal for developing a first error signal related in frequency to the frequency difference between said IF carrier and said first reference signal and dependent upon the instantaneous phase difference between said first reference signal and said IF carrier;

second phase discriminator means receiving as inputs said IF carrier and said second reference signal for developing a second error signal related in frequency to the frequency difference between said IF carrier and said second reference signal and dependent upon the instantaneous phase difference between said second reference signal and said IF carrier input, the relative phase of said first and second reference signals and the relative phase of said IF carrier at the inputs to said first and second phase discriminator means being chosen to cause the instantaneous phase difference between the inputs of said first phase discriminator means and the instantaneous phase difference between the inputs to said second phase discriminator means to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent on said phase relationship between said error signals;

summing means receiving one of said first and second error signals plus said DC output voltage of said combining means to generate a composite control signal having AC and DC components;

means responsive to said composite control signal generated by said summing means for adjusting the frequency and phase of said local oscillator toward a condition of synchronization wherein the frequency and phase of said IF signal are locked to the frequency and related to the phase of said reference signals.

10. A system as defined in claim 9 wherein said combining means includes a multiplier, means for coupling one of said first and second error signals to said multiplier and a frequency dependent phase shift network which is coupled between said multiplier and the other of said error signals, said phase shift network introducing a frequency dependent phase shift in said other error signal to provide said multiplier with two error signals of like frequency whose phase difference varies according to the frequency of said error signals.

11. A system as defined in claim 10 wherein said fixed phase difference between said first and second reference signals is such that the dot product of the vectors of said error signals applied to said multiplier changes sign as the frequency of said IF carrier becomes greater or less than the frequency of said reference signals.

12. A system as defined in claim 10 for purposes of locking a desired IF carrier to said predetermined frequency $f_o$ when said desired carrier is accompanied by an associated carrier having a frequency lower than $f_o$ by a fixed frequency difference $\Delta f$, wherein the frequency of said first and second reference signals, said fixed phase difference between said first and second reference signals, and said frequency dependent phase shift produced by said phase shift network are such that a phase relationship is created between said error signals received by said multiplier which causes the dot product of the vectors associated with said error signals to exhibit the following characteristics, namely: said dot product has a first predetermined polarity in response to a carrier having an IF frequency greater than $f_o$, a second predetermined polarity in response to a carrier having an IF frequency between $f_o$ and a predetermined frequency $f_1$ which is lower than $f_o$ by less than $\Delta f$, and said first predetermined polarity in response to a carrier having an IF frequency below $f_1$ whereby, when the receiver is mistuned such that the IF frequency of said desired carrier is higher than $f_o$ while the frequency of said associated carrier remains less than $f_1$, the DC output voltage generated in response to said associated carrier is of the same polarity as that generated by said multiplier in response to said desired carrier.

13. A system as defined in claim 9 wherein the gain of the automatic frequency control loop including said first and second phase discriminators, said multiplier and said summing network is such that, when said automatic fine tuning system attempts to lock onto an undesired carrier whose frequency is different from that of the desired carrier, the AC component of said composite control signal generated in response to said desired carrier is of a magnitude sufficient to cause the DC component of said composite control signal to lose control of said local oscillator, thereby forcing the local oscillator to adjust its frequency in response to said AC component so as to lock onto said desired carrier.

14. A system as defined in claim 9 wherein said combining means includes a multiplier, a first phase shift network coupling one of said first and second error signals to said multiplier, and a second phase shift network coupling the other of said error signals to said multiplier, said first and second phase shift networks having predetermined time constants associated therewith for introducing in said error signals predetermined frequency dependent phase shifts, thereby causing said multiplier to generate a DC output voltage having one or more zeros at preselected frequencies of said error signals.

15. In an RF receiver, a dual mode automatic fine tuning system capable of both automatic frequency and phase control with a synchronous type modulation detection system comprising:

a tuner having a local oscillator and mixer for purposes of converting a selected modulated RF carrier to an IF carrier having a predetermined frequency;

means for generating first, second, and third reference signals of like predetermined frequency and having predetermined fixed phase differences;

first phase discriminator means receiving as inputs said IF carrier and said first reference signal for developing a first error signal related in frequency to the frequency difference between said IF carrier and said first reference signal and dependent upon the instantaneous phase difference between said first reference signal and said IF carrier;

second phase discriminator means receiving as inputs said IF carrier and said second reference signal for developing a second error signal related in frequency to the frequency difference between said IF carrier and said second reference signal and dependent upon the instantaneous phase difference between said second reference signal and said IF carrier input, the relative phase of said first and second reference signals and the relative phase of said IF carrier at the inputs to said first and second phase discriminator means being chosen to cause the instantaneous phase difference between the inputs of said first phase discriminator means and the instantaneous phase difference between the inputs to said second phase discriminator mans to be unequal by an amount other than a multiple of 180°, whereby a comparison of the phases of said first and second error signals indicates the polarity of the frequency difference between said IF carrier and said reference signals;

combining means receiving said first and second error signals for generating a DC output voltage having a magnitude dependent on the frequency of said error signals and a polarity dependent upon said phase relationship between said error signals;

summing means receiving one of said first and second error signals plus said DC output voltage of said combining means to generate a control voltage having AC and DC components;

means responsive to the control voltage generated by said summing means for adjusting the frequency and phase of said local oscillator toward a condition of synchronization wherein the frequency and phase of said IF signal are locked to the frequency and phase of said third reference signal;

a synchronous-type detector receiving said IF carrier and said third reference signal for developing an output consisting of the product of said IF carrier and said third reference signal, said product including the information contained in the modulation of said carrier.

16. A system as defined in claim 15 wherein said combining means includes a multiplier, means for coupling one of said first and second error signals to said multiplier, and a frequency dependent phase shift network which is coupled between said multiplier and the other of said error signals, said phase shift network introducing a frequency dependent phase shift in said other error signal to provide said multiplier with two error signals of like frequency whose phase difference varies according to the frequency of said error signals.

17. A system as defined in claim 16 wherein said fixed phase difference between said first and second reference signals is such that the dot product of the vectors of said error signal applied to said multiplier changes sign as the frequency of said IF carrier becomes greater or less than the frequency of said reference signals.

18. A system as defined in claim 16 for purposes of locking a desired IF carrier to said predetermined frequency $f_o$ when said desired carrier is accomplished by an associated carrier having a frequency lower than $f_o$ by a fixed frequency difference $\Delta f$, wherein the frequency of said first and second reference signals, said fixed phase difference between said first and second reference signals, and said frequency dependent phase shift produced by said phase shift network are such that a phase relationship is created between said error signals received by said multiplier which causes the dot product of the vectors associated with said error signals to exhibit the following characteristics, namely: said dot product has a first predetermined polarity in response to a carrier having an IF frequency greater than $f_o$, a second predetermined polarity in response to a carrier having an IF frequency between $f_o$ and predetermined frequency $f_1$ which is lower than $f_o$ by less than $\Delta f$, and said first predetermined polarity in response to a carrier having an IF frequency below $f_1$ whereby, when the receiver is mistuned such that the IF frequency of said desired carrier is higher than $f_o$ while the frequency of said associated carrier remains less than $f_1$, the DC output voltage generated in response to said associated carrier is of the same polarity as that generated by said multiplier in response to said desired carrier.

19. A system as defined in claim 15 wherein the gain of the automatic frequency control loop including said first and second phase discriminators, said multiplier and said summing network is such that, when said automatic fine tuning system attempts to lock onto an undesired carrier whose frequency is different from that of the desired carrier, the AC component of said composite control signal generated in response to said desired carrier is of a magnitude sufficient to cause the DC component of said composite control signal to lose control of said local oscillator, thereby forcing the local oscillator to adjust its frequency in response to said AC component so as to lock onto said desired carrier.

20. A method of automatic frequency and phase control useful in a television receiver comprising:

converting a selected RF carrier to an IF carrier having an IF frequency approximate to a desired IF frequency by heterodyning with said selected RF carrier a local oscillator signal having a frequency approximate to that which will yield said desired IF frequency;

comparing said IF carrier with a first reference signal of predetermined frequency for developing a first AC error signal related in frequency to the frequency difference between said IF carrier and said first reference signal and dependent upon the instantaneous phase difference between said first reference signal and said IF carrier;

comparing said IF carrier with a second reference signal having a frequency equal to that of said first reference signal and having a predetermined phase relationship with respect thereto to develop a second AC error signal related in frequency to the frequency difference between said IF carrier and said second reference signal and dependent upon the instantaneous phase difference between said second reference signal and said IF carrier, the relative phase of said first and second reference signals and said IF carrier being chosen to cause the instantaneous phase difference between the IF carrier and the first reference signal and the instantaneous phase difference between the IF carrier and the second reference signal to be unequal by an amount other than a multiple of 180°, whereby a comparison of the phase of said first and second AC error signals indicates the polarity of the frequency difference between said input signal and said reference signals;

combining said first and second AC error signals to generate a DC output voltage having a magnitude dependent upon the frequency of said AC error signals and a polarity dependent upon the phase relationship between said AC error signals;

summing said DC output voltage and one of said first and second error signals to generate a composite control signal having AC and DC components;

utilizing said composite control signal to adjust the frequency and phase of said local oscillator signal such that the frequency of said IF carrier is that of said desired IF frequency and the phase of said IF carrier is related to the phase of said first and second reference signals.

* * * * *